Nov. 22, 1927. 1,650,361
C. F. JENKINS
APPARATUS FOR CONVERTING ELECTRICAL IMPULSES INTO GRAPHIC REPRESENTATIONS
Filed April 22, 1926
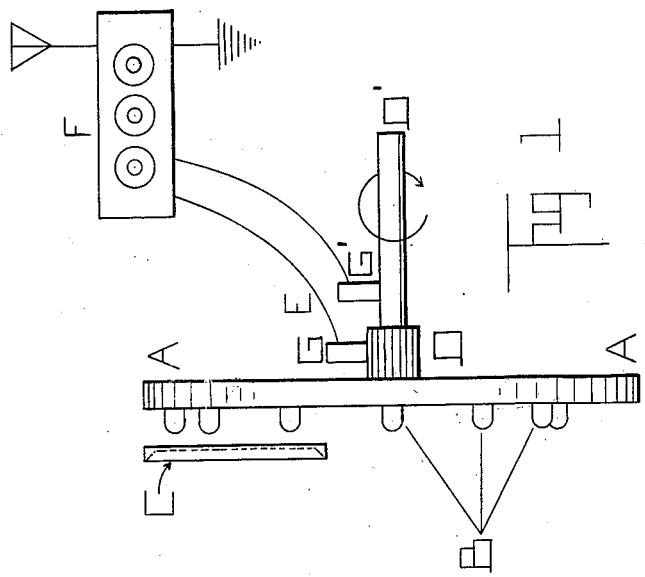
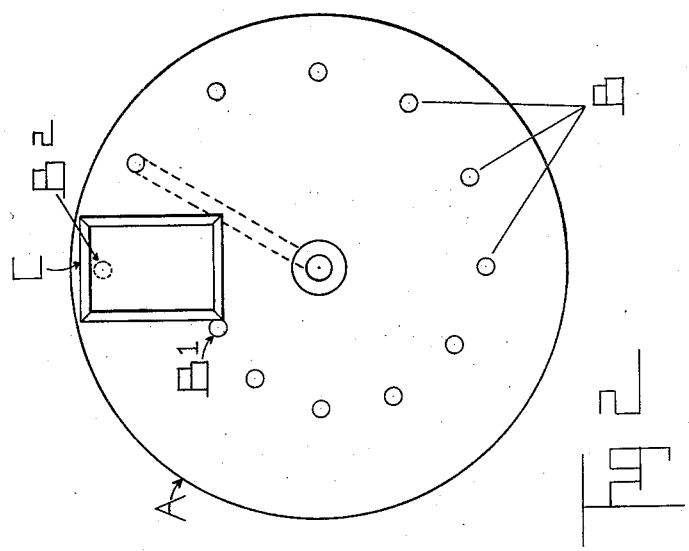
Inventor
Charles Francis Jenkins
By *Paul Carpenter*
Attorney Patented Nov. 22, 1927.

1,650,361

UNITED STATES PATENT OFFICE.

CHARLES FRANCIS JENKINS, OF WASHINGTON, DISTRICT OF COLUMBIA.

APPARATUS FOR CONVERTING ELECTRICAL IMPULSES INTO GRAPHIC REPRESENTATIONS.

Application filed April 22, 1926. Serial No. 103,691.

This invention relates to methods and apparatus for converting electrical impulses into graphic representations particularly those transmitted at a rate of speed which, when viewed by an observer, will appear as the original representation of composites and in cycles of speed of transmission to give persistence of vision and the appearance of a moving object similar to that commonly known as moving pictures.

This invention is premised on the observation that visual representations may be converted into pulsating electrical current varying in intensity as fractional areas of a visual representation vary to predetermined areas thereof and that the current so transmitted may be reconverted into a visual representation, and the further observation that radio frequency oscillation may be utilized for obtaining pulsating effects whether transmitted through the ether to avoid the distribution of conductors or over well defined paths of conduction commonly termed wired-wireless.

This invention is further premised on the observation that rapidly pulsating light distributed over predetermined areas may be given the effect of a visual representation and the further observation that an exceedingly high degree of pulsation of current may be utilized to create said rapidly pulsating light.

This invention therefore has for an object thereof the provision of a method for converting pulsating currents of intensity varying as fractional areas of a visual representation vary to predetermined portions thereof, into a visual representation or light arranged to display a reproduction of the original image, or a record energized by said light representing the original.

The invention further contemplates the provision of a method of converting a pulsating current varying in intensity as fractional areas of the visual representation vary to predetermined areas thereof, by converting the current into light through the use of light generating elements arranged to display the impulses of light within limits giving persistence of vision, thus giving a composite simulating a reproduction of the original image. The invention also contemplates transmitting cycles of composite visual representations so that light generating elements arranged to display corresponding light pulsations will give not only persistence of vision of a composite but also various phases of the composite giving the effect of what is commonly termed moving pictures.

The invention still further contemplates transmitting pulsating currents varying in intensity as fractional areas of the visual representation vary to the predetermined areas thereof and distributing the current to a plurality of light generating elements which are given a speed of movement to give within limited areas impulses of light at the rate giving persistence of vision simulating a composite representation.

In the more particular embodiment of my invention provision is made to convert pulsating current varying in intensity as fractional areas of a visual representation vary to predetermined areas thereof, to light, by distributing the same to light generating elements, the method including arcuately moving the light generating elements in a series of parallel arcs, the length of the radii thereof varying as the radial displacements of a spiral relatively to the center, whereby a composite representation will be presented. The method also includes converting the pulsations of current in cycles representing the various composites, whereby varying composites will give the appearance of what is commonly termed motion pictures.

In a still further particular embodiment provision is made to convert pulsating current varying in intensity as fractional areas of a visual representation vary to predetermined areas thereof, to light, by distributing the current to light generating elements which are energized and arranged to give within limited areas a composite representation simulating the original, whether due to the light itself, a reflection thereof or a temporary indication, or a more or less permanent record.

The invention still further has for an object thereof, the provision of a device for transmitting a visual representation by combining with means capable of furnishing a pulsating current varying in intensity as fractional areas of a visual representation vary to predetermined areas thereof, of a light generating element adapted to be energized by the pulsating current and display pulsations of light having persistence of vision simulating the original, whether due to the light itself, a reflection thereof, or a temporary indication or a more or less permanent record.

The invention contemplates as an object thereof the provision of a device in combination with means for producing a pulsating current, of light generating elements displayed arcuately and energized within limited areas of observation in a series of arcuately arranged parallel lines having persistence of vision and simulating a visual representation of a character similar to the original.

In a more particular embodiment of my device, visual representations are presented by combining with an electrical circuit adapted to supply a pulsating current varying in intensity as fractional representations of a visual representation vary to predetermined areas thereof, of a plurality of light generating elements mounted for rotatable movement with reference to conductors of said circuit to display pulsations of light in a transverse plane whereby a composite representation will be presented within limited areas, the apparatus contemplating receiving cycles of pulsations representing composites in degrees of variations having persistence of vision and simulating a series of representations of a character commonly termed motion pictures whether due to direct display of the light itself, a reflection thereof or of a temporary indication or a more or less permanent record.

In the attainment of the foregoing objects, together with such further objects and additional benefits and advantages as may hereinafter appear or be pointed out, I have provided a construction, one embodiment of which is illustrated in the accompanying drawing, wherein Figure 1 is a schematic representation of a receiving and displaying device, and Figure 2 is a front elevation of a part of the device of Figure 1.

In the practice of the invention, a receiving device is provided preferably capable of being controlled by radio frequency oscillations generated by a sending station commonly used for wireless telephony to obtain pulsating current varying in intensity as fractional areas of a visual representation vary to predetermined portions thereof and converting the same into light impulses. It will be understood, however, that the receiving device may be controlled by a transmitting station making use of one or more conductors other than the ether for generating the pulsating currents of the character mentioned and for certain purposes the so-called "wired-wireless" circuits may be utilized.

The pulsations of current utilized are not only of a character varying in intensity as regards a single composite visual representation but may be in cycles of pulsations representing a series of variations of visual representation transmitted at a speed within limits giving persistence of vision and simulating various stages of what is commonly referred to as motion pictures.

The pulsations of current so received are used to energize a light generating element which the light whereof is arranged to be moved and distributed over an area whereby the pulsations thereof give persistence of vision representing a composite visual representation simulating in character that of the original. The impulses of light may be utilized directly or may be reflected upon a screen to give a temporary indication or a more or less permanent record by impressing the light impulses upon a photo-chemical plate or film.

In the preferred embodiment of my invention, the method of picture transmission includes distributing pulsations of current of the character referred to, to a plurality of light generating elements which are caused to display light due to the energizing current in a series of parallel lines within a limited area, giving persistence of vision representing a composite visual image.

For the practice of the method above described, I have utilized a device adapted to receive pulsations of current and for this purpose I may utilize well known radio receiving apparatus, generally referred to as F, and which is arranged to convert the transmitted currents of radio frequency oscillation into corresponding currents capable of energizing light generating elements. The output of the receiver F is led to the light generating mechanism by means of the leads E and the brushes G and G' to contact with the commutator D and the shaft D' of the rotatable disk A. Mounted upon the disk A there are provided a plurality of light generating elements, generally referred to as B, and which are electrically connected to the output and the leads E through the commutator D and the shaft D' so as to be alternately energized by the current of the output of the receiving device. Thus by rotating the shaft D' when current is flowing through the conductors E, the light generating elements will be energized in accordance with the pulsations of current.

It will be observed that I may position the brushes G and G' to subtend a certain segmental portion of the commutator D so that the light generating elements are only energized when the leads thereof are brought into alignment with the segmental portion between the brushes. Thus I am enabled to energize the light generating elements within limited areas.

In a further embodiment of my invention I prefer to position a translucent screen to receive the reflections of the light generating elements as they are energized by the pulsating current of the electrical circuit. It will be observed that the screen C is positioned to correspond with the segmental portion subtended by the brushes G and G'. It will also be observed that I prefer for certain purposes to position the rotating mechanism and screen within a chamber, eliminating outside light disturbances and displaying only the translucent screen. Thus I am enabled to obtain better contrast of the pulsations of light upon the screen.

It will also be observed that though I have described a plurality of light generating elements mounted upon the rotating disk, that I may accomplish the purpose of my invention by a single light generating element and distributor and obtain results suitable for some purposes, accomplishing the desired result by a speed of rotation giving persistance of vision to the light impulses generated by the circuit.

In my preferred embodiment, the light generating elements are positioned upon a disk radially displaced from the axis so that the radial distance corresponds to the lengths of the radii of corresponding points of a spiral. Preferably the radial displacement of the light elements is such as to vary between $B^1$ and $B^2$ as the size of the translucent screen. By this construction the light generating elements will describe a series of parallel lines within the limits of the screen. It will be understood that the pulsations of current are so timed with the rotation of the disk so that each revolution will display a series of pulsations of light representing a single composite. The visual persistence of these composites may be accentuated by repeating the pulsations in accordance with each single composite. However, in order to transmit what may be termed a motion picture effect the pulsations are made to correspond to cycles of composites, each cycle varying in reference to a subsequent cycle in amounts sufficient to display the pulsations of light as the movements of the original moving object or visual representation.

It will be observed that to obtain persistence of vision, these cycles of pulsations may be transmitted at the rate of 960 per minute or more frequently, wherein in each cycle the pulsations are repeated to give greater persistence of vision to each composite and that the display device is synchronized accordingly.

In the construction shown it will be observed that within the limits of the screen there are displayed a plurality of parallel light lines arcuately disposed and that as the pulsations vary, the lines within their limits will assume varying degrees of illumination and when these lines have traversed the entire area will represent a composite visual image simulating the original, due to the high speed of revolution of the light distributing elements within this area.

It will be observed that in providing light energizing elements for my purpose, it is preferred that this element is one energized by electrical currents, responding to small variations in pulsations to give corresponding degrees of illumination or energy, so that with the variations in pulsations there will be no lag in energizing of the light generating element but the illumination or the effective impulse will correspond to the pulsations of the transmitted current. It will also be observed that I prefer to make the light generating elements of diminished size so that a great number of points may be subtended within a limited area.

Having thus described my invention and illustrated its use, what I claim as new and desire to secure by Letters Patent is—

1. In a device for transmitting visual representations, the combination with means for generating an electrical circuit adapted to supply a pulsating current varying in intensity as fractional areas of a visual representation vary in light density, light generating elements, a translucent display screen therefor and means for directing said light generating elements energized by said circuit successively upon said screen, said light generating elements being arranged in a spiral path whereby a composite representation is displayed in a predetermined area.

2. In a device for transmitting visual representations, the combination with a means for generating an electrical circuit to supply a pulsating current varying in intensity as fractional areas of a visual representation vary in light density, a translucent display screen and a plurality of light generating members adapted to be energized by said circuit and reflect on said screen.

3. In a device for transmitting visual representations, the combination with means for generating an electrical circuit to supply a pulsating current varying in intensity as fractional areas of a visual representation vary in light density, a plurality of light generating elements and conductors therefor, a translucent display screen arranged in a transverse plane to said conductors and means adapted to conduct said elements energized by said circuit in close proximity to said screen.

4. In a device for transmitting visual representations, the combination with means for generating an electrical circuit adapted to supply a pulsating light varying in intensity as fractional areas of a visual representation vary in light density, a plurality of light generating elements, a translucent display screen arranged in a transverse plane to said elements, a plurality of light conductor members for completing the circuit of said light elements and means directing the said elements in close proximity to said screen and means adapted to move said elements in rapid succession relative to said screen.

In testimony whereof I have hereunto signed my name.

CHARLES FRANCIS JENKINS.